J. Davis,

Saw.

No. 4,068. Reissued July 12. 1870.

Witnesses:
R. H. Ormshall
Thos. B. Kerr

Applicants:
James Davis,
Ford W. Davis,
by Bakewell & Johnson
their Attys.

N. PETERS, PHOTO-LITHOGRAPHER, WASHINGTON, D. C.

United States Patent Office.

JAMES DAVIS, FOR HIMSELF, AND FORD W. DAVIS, ASSIGNEE OF JAMES DAVIS, OF PHILADELPHIA, PENNSYLVANIA.

*Letters Patent No.* 72,983, *dated January* 7, 1868; *reissue No.* 4,068 *dated July* 12, 1870.

IMPROVEMENT IN SAWS.

The Schedule referred to in these Letters Patent and making part of the same.

*To all whom it may concern:*

Be it known that JAMES DAVIS, of the city of Philadelphia, in the county of Philadelphia and State of Pennsylvania, has invented a new and useful Improvement in Saws; and we do hereby declare the following to be a full, clear, and exact description thereof, reference being had to the accompanying drawing making a part of this specification, in which—

Figure 1:
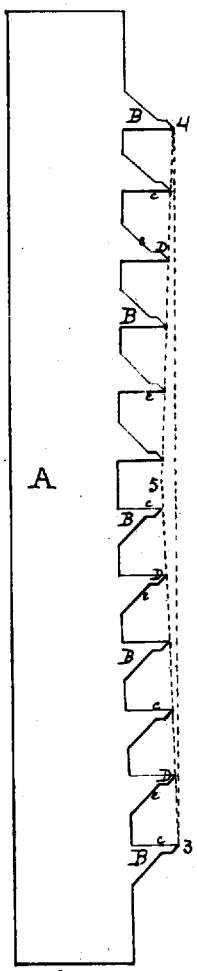
Figure 2:
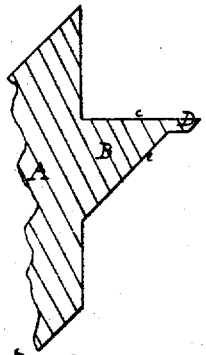

Figure 1 is a side elevation of a mill or gang-saw, illustrative of the improvement, and Figure 2 is an enlarged view of the improved saw-tooth.

Like letters of reference indicate like parts in each.

The nature of this invention consists—

First, in the manufacture of rectilinear mill or gang-saws, making the saw-teeth on both the upper and lower portions of the saw, from the center of the saw outward, with a forward rake or set, so that the upper part will cut during the downward stroke, and the lower part during the upward stroke; and Second, in extending the point of a saw-tooth beyond the line of the back of the tooth to give greater ease and facility in sharpening the same.

To enable others skilled in the art to make and use the said invention, we will proceed to describe its construction and mode of operation.

A represents the saw-plate, and

B, the saw-teeth.

The teeth above the center of the saw have the cutting-edges *c* on the side nearest said center, as have also the teeth below the center.

The cutting-edges *c* are also slightly inclined or pitched toward the center.

The teeth above the center have a forward set or rake, as shown by the angle formed by the dotted line 4 5, drawn through the points of the teeth, with the vertical line 3 4.

The teeth below the center have also a forward rake or set, the reverse of those above, as shown by the line 3 5, drawn through their points.

This arrangement of the teeth enables the saw to cut during both its downward and upward stroke, the double rake clearing the kerf in both directions.

By cutting during both up and down stroke, the strain upon the machinery by which the motion is produced, is made more equal and uniform than with the single-cutting saw, and the amount of work which the saw will accomplish is doubled with only a slight increase of driving power.

D represents the point of the tooth which is projected beyond the back line *e* of the tooth.

The length of the projection measured parallel with the back line *e*, should be about five-eighths of an inch, or sufficient to give the requisite strength. In sharpening the saw only this projection will require filing, thereby saving greatly in labor, time, and wearing of files.

What we claim as the invention of the said JAMES DAVIS, and desire to secure by Letters Patent, is—

1. Making the saw-teeth on both the upper and lower portions of the saw, from the center of the saw outward, with a forward rake or set, substantially as described.

2. The projection D at the point of the saw-tooth, for the purpose set forth.

In testimony whereof, we, the said JAMES DAVIS and FORD W. DAVIS, have hereunto set our hands.

JAMES DAVIS.
FORD W. DAVIS.

Witnesses:
THOS. B. KERR,
JOHN GLENN.